United States Patent
Schumacher

(10) Patent No.: US 9,697,008 B2
(45) Date of Patent: Jul. 4, 2017

(54) HIDING LOGICAL PROCESSORS FROM AN OPERATING SYSTEM ON A COMPUTER

(75) Inventor: Derek Schumacher, Auburn, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/378,971

(22) PCT Filed: Feb. 22, 2012

(86) PCT No.: PCT/US2012/026128
§ 371 (c)(1),
(2), (4) Date: Aug. 14, 2014

(87) PCT Pub. No.: WO2013/126056
PCT Pub. Date: Aug. 29, 2013

(65) Prior Publication Data
US 2015/0033006 A1    Jan. 29, 2015

(51) Int. Cl.
*G06F 9/44* (2006.01)
*G06F 11/22* (2006.01)

(52) U.S. Cl.
CPC .......... *G06F 9/4405* (2013.01); *G06F 9/4403* (2013.01); *G06F 11/2284* (2013.01)

(58) Field of Classification Search
None
See application file for complete search history.

(56) References Cited

U.S. PATENT DOCUMENTS

| | | |
|---|---|---|
| 6,453,344 B1 | 9/2002 | Ellsworth et al. |
| 7,752,495 B2 | 7/2010 | Zorek, Sr. et al. |
| 7,814,366 B2 | 10/2010 | Apparao et al. |
| 2002/0099886 A1 | 7/2002 | Emerson et al. |

(Continued)

FOREIGN PATENT DOCUMENTS

| | | |
|---|---|---|
| CN | 101371224 | 2/2009 |
| EP | 2239662 A2 | 10/2010 |

(Continued)

OTHER PUBLICATIONS

"UEFI vol. 2: Platform Inititalization Specification—Driver Execution Environment Core Interface", Oct. 27, 2011, 218 pps.

(Continued)

*Primary Examiner* — Thomas Lee
*Assistant Examiner* — Vincent Chang
(74) *Attorney, Agent, or Firm* — Hewlett Packard Enterprise Patent Department

(57) ABSTRACT

Hiding logical processors from an operating system (OS) of a computer is described. In an example, a method of hiding at least one logical processor in a computer having a plurality of logical processors includes: initializing the plurality of logical processors by executing a pre-boot routine in system firmware; identifying at least one logical processor of the plurality of logical processors to be hidden from an operating system (OS) of the computer to provide at least one hidden logical processor and at least one visible logical processor; placing each of the at least one hidden logical processor into a system management mode (SMM) by executing a park routine in the system firmware; and booting the OS of the computer to use the at least one visible logical processor.

16 Claims, 3 Drawing Sheets

(56) References Cited

U.S. PATENT DOCUMENTS

| | | |
|---|---|---|
| 2004/0186688 A1 | 9/2004 | Nejedlo |
| 2005/0060531 A1 | 3/2005 | Davis et al. |
| 2005/0172164 A1 | 8/2005 | Fox et al. |
| 2006/0004942 A1 | 1/2006 | Hetherington et al. |
| 2008/0229146 A1 | 9/2008 | Arai |
| 2009/0007120 A1 | 1/2009 | Fenger et al. |
| 2009/0119748 A1 | 5/2009 | Yao |
| 2009/0144579 A1* | 6/2009 | Swanson ............ G06F 11/0712 714/3 |
| 2009/0172228 A1* | 7/2009 | Zimmer ............... G06F 9/4405 710/260 |
| 2009/0172232 A1* | 7/2009 | Zimmer ................ G06F 13/24 710/268 |
| 2009/0183016 A1* | 7/2009 | Chan .................... G06F 1/3203 713/323 |

FOREIGN PATENT DOCUMENTS

| | | |
|---|---|---|
| JP | 2007-172591 | 7/2007 |
| JP | 2010-250817 | 11/2010 |
| WO | WO-2006004875 A1 | 1/2006 |

OTHER PUBLICATIONS

"UEFI vol. 4: Platform Initialization Specification—System Management Mode Core Interface", Oct. 27, 2011, 292 pps.

Anonymous: "System Management Mode—Wikipedia, the free encyclopedia", Aug. 8, 2011, 3 pps.

EPO, Extended Supplementary Search Report, mailed Oct. 13, 2015, EP App No. 12869523.6, 12 pps.

Loic Duflot, "Using CPU System Management Mode to Circumvent Operating System Security Functions" Cansecwest 2009, http://fawlty.cs.usfca.edu/~cruse/cs630f06/duflot.pdf.

ISA/KR, International Search Report, mailed Feb. 28, 2013, PCT/US2012/026128 filed Feb. 22, 2012.

* cited by examiner

HIDING LOGICAL PROCESSORS FROM AN OPERATING SYSTEM ON A COMPUTER

BACKGROUND

Computer systems can have at least one central processing unit (CPU) integrated circuit (IC), each having at least one processor or "core". In some cases, each processor core can execute a plurality of threads. For example, commercially available CPUs from Intel Corporation, such as the INTEL CORE i7 CPU, can include two cores (dual core), four cores (quad core), or six cores (hex core), where each of the cores provides two threads. A circuit board or "mainboard" in a computer system can include at least one socket each supporting a CPU IC. For example, a mainboard can support two sockets for quad-core CPU ICs.

The cost of licensing some types of software, such as database software, depends on the number of processors in the computer on which the software is installed. The software may count physical sockets, physical cores, or core threads. The more processors available, the greater the cost of licensing the software. In some cases, enterprises purchase several computers with the same configuration, but utilize each of them differently. For example, some uses of a computer may not require all of the available processors. Thus, users can pay increased software licensing costs, even if they don't require all of the processors to perform the designated function of the computer.

BRIEF DESCRIPTION OF THE DRAWINGS

Some embodiments of the invention are described with respect to the following figures.

DETAILED DESCRIPTION

Hiding logical processors from an operating system (OS) of a computer is described. In an embodiment, logical processors in a computer are initialized by executing a pre-boot routine in system firmware. For example, a power-on self-test (POST) can be performed to initialize the logical processors and other components of the computer. At least one of the logical processors is identified to be hidden from the OS to define hidden logical processor(s) and visible logical processor(s). Each of the hidden logical processor(s) is placed into system management mode (SMM) by executing a park routine in the system firmware. SMM is an operating mode in which normal execution is suspended and thus a logical processor in SMM is not usable by the OS. The OS of the computer is booted to use the visible logical processor(s). A "logical processor" can include a CPU IC (e.g., socket), a CPU IC core, or a thread on core, depending on the capabilities of the CPU IC(s) employed.

"Parking" or hiding logical processors can require the use of proprietary operating systems designed to operate with CPUs having specialized processor architectures. Embodiments described herein can be used with widely available x86-based CPUs, such as those commercially available from Intel and AMD, which do not have specialized architectures for parking logical processors. Further, embodiments described herein can be used with widely available x86-based operating systems, such as MICROSOFT WINDOWS, RED HAT LINUX, or the like. In some examples, the logical processors can be hidden from the OS and its applications without any dependency on the OS itself. By hiding logical processors that are not needed, software licenses based on the number of CPU ICs (e.g., sockets), CPU IC cores, or core threads can be reduced. Embodiments of the invention can be understood with respect to the following example implementations.

Figure 1:
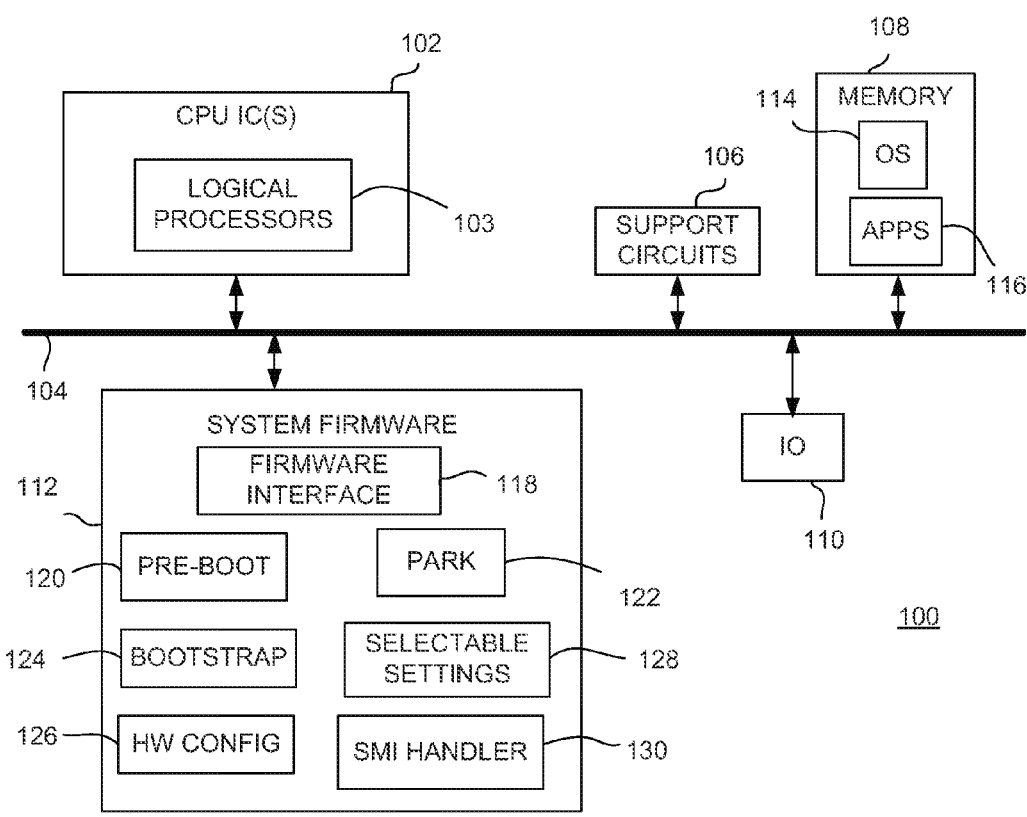
FIG. 1 is a block diagram of a computer system according to an example implementation.

FIG. 1 is a block diagram of a computer system 100 according to an example implementation. The computer system 100 includes at least one central processing unit (CPU) integrated circuit (IC) 102, various support circuits 106, memory 108, various input/output (IO) circuits 110, a system firmware 112, and interconnect circuits 104. The interconnect circuits 104 can provide busses, bridges, and the like to facilitate communication among the components of the computer system 100. The CPU IC(s) 102 each can include at least one physical "core". Each physical core can include at least one thread. In general, the computer system 100 includes logical processors 103, which can be CPU ICs, cores, or threads, depending on the capability of the CPU IC(s) 102. The CPU IC(s) 102 are of a type that support a system management mode (SMM) where all normal execution, including that by an operating system, is suspended, instead providing special execution of a routine in the system firmware 112. Exemplary CPU IC(s) that support SMM include x86-based processors commercially available from Intel and AMD.

The support circuits 106 can include cache, power supplies, clock circuits, data registers, and the like. The memory 108 can include random access memory, read only memory, cache memory, magnetic read/write memory, or the like or any combination of such memory devices. The memory 108 can store an operating system (OS) 114 and software applications ("apps 116") for execution by the CPU IC(s) 102. The IO circuits 110 can facilitate communication to and from the CPU IC(s) 102 and/or the memory 108.

The system firmware 112 includes a firmware interface 118. The firmware interface 118 can include a basic input/output system (BIOS), unified extensible firmware interface (UEFI), or the like. The system firmware 112 further includes a pre-boot routine 120, a park routine 122, and a bootstrap routine 124. The pre-boot routine 120 includes code that is executed by the CPU IC(s) 102 first upon boot or reset. The pre-boot routine 120 initializes the CPU IC(s) 102 and other components of the computer system 100 (e.g., the memory 108). For example, the pre-boot routine 120 can include a power-on self-test (POST) routine. Notably, some types of CPU ICs, such as certain x86-based CPU ICs, require at least one logical processor be enabled during boot to be able to initialize the CPU IC properly. All of the logical processors 103 in the computer system are enabled during execution of the pre-boot routine 120 so that the CPU IC(s) 102 is/are properly initialized.

The park routine 122 includes code that is executed by the CPU IC(s) 102 after the pre-boot routine 120. The park routine 122 identifies which of the logical processors 103 can be hidden from the OS and "parks" such logical processors. For example, the park routine 122 defines hidden logical processor(s) to be parked, and visible logical processor(s) for use by the OS 114. The park routine 122 places each of the hidden logical processors into SMM. The hidden or parked processor(s) are under control of the system firmware 112 and the park routine 122. Those of the logical processors 103 that are under control of the system firmware 112 and hidden from the OS 114 are "hidden logical processor(s)" or "firmware-controlled logical processor(s)". Those of the logical processors 103 that are available for use by the OS 114 are "visible logical processor(s)" or "OS-controlled logical processor(s)."

The bootstrap routine 124 includes code that is executed by the CPU IC(s) 102 after the park routine 122. The bootstrap routine 124 boots the OS 114 to use the visible logical processor(s) (e.g., the visible logical processor(s) can enter an OS-usable mode, such as protected mode on an x86-based processor). The OS 114 does not have access or visibility to the hidden logical processor(s).

Figure 2:
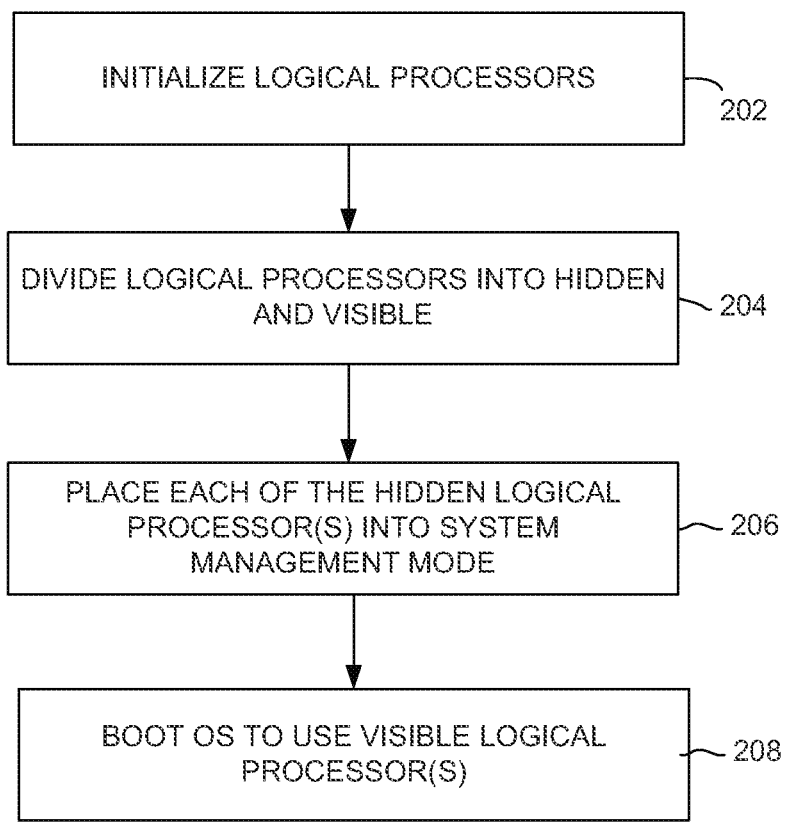
FIG. 2 is a flow diagram depicting a method of hiding logical processor(s) in a computer having a plurality of logical processors according to an example implementation.

FIG. 2 is a flow diagram depicting a method 200 of hiding logical processor(s) in a computer having a plurality of logical processors according to an example implementation. The method 200 can be understood with reference to the computer system 100 of FIG. 1. The method 200 begins at step 202, where the logical processors 103 are initialized by executing the pre-boot routine 120 in the system firmware 112.

At step 204, the logical processors 103 are divided into hidden logical processor(s) and visible logical processor(s). In an example, the system firmware 112 stores hardware configuration attributes 126. The hardware configuration attributes 126 can describe the configuration of the computer 100 as deployed. For example, the hardware configuration attributes 126 can indicate that the computer 100 is configured as a device that substantially provides memory and IO functions, rather than computationally-intensive functions. The park routine 122 can analyze the hardware configuration attributes 126 to determine a particular number of logical processors to be hidden. For example, the hardware configuration attributes 126 can indicate one of a plurality of roles, and the park routine 122 can be configured to park a particular number of logical processors for each of such roles.

In another example, the system firmware 112 stores selectable settings 128. For example, the firmware interface 118 can provide a graphical user interface (GUI) or command line interface (CLI) to allow a user to interact and define the selectable settings 128. The park routine 122 can analyze the selectable settings 128 to determine a particular number of logical processors to be hidden. For example, the selectable settings 128 can indicate one of a plurality of roles, and the park routine 122 can be configured to park a particular number of logical processors for each of such roles. Alternatively, the selectable settings 128 can include a specific user-selectable setting for the number of logical processors to be parked and hidden from the OS.

At step 206, the park routine 122 places each of the hidden logical processor(s) into SMM. At step 208, the bootstrap routine 124 boots the OS 114 to use the visible logical processor(s). For example, the bootstrap routine 124 can inform the OS 114 of the visible logical processor(s) using advanced configuration and power interface (ACPI) tables. Once the OS 114 is booted, hidden logical processor(s) will not be visible to the OS 114 and cannot be interrupted, since the hidden logical processor(s) are in SMM and responding to the system firmware 112. Since the hidden logical processor(s) are not visible to the OS 114, such hidden logical processor(s) are not visible to the software applications 116. Depending on the logical processors that are hidden, this can result in those processors not being considered by any of the software applications 116 that determine license costs based on the number of CPU ICs, cores, or threads.

Returning to FIG. 1, the system firmware 112 also includes a system management interrupt (SMI) handler 130. The SMI handler 130 includes a routine for handling system management interrupts for the logical processor(s) 103. The SMI handler 130 can also handle machine check exceptions (MCEs) and like-type computer hardware errors for the hidden logical processor(s).

Figure 3:
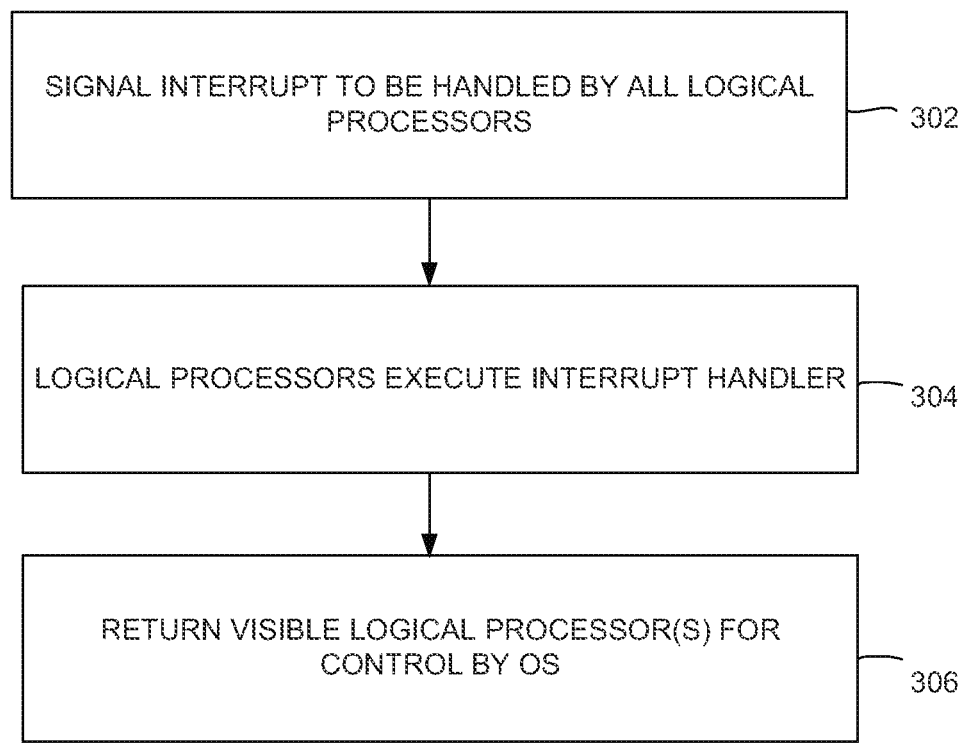
FIG. 3 is a flow diagram depicting a method of interrupting hidden logical processors according to an example implementation.

FIG. 3 is a flow diagram depicting a method 300 of interrupting hidden logical processors according to an example implementation. The method 300 can be understood with reference to the computer 100 of FIG. 1, The method 300 begins at step 302, where an interrupt to be handled by all of the logical processors 103 is signaled. For example, a global SMI can be signaled. The global SMI can be signaled by the OS 114, or other hardware in the computer system 100. The global SMI interrupts all of the visible logical processor(s) and causes such processors to enter SMM ("OS-visible SMM processor(s)"). The hidden logical processor(s) remain in SMM.

At step 304, the logical processors 103 execute the SMI handler 130. In an example, the SMI handler 130 includes default code, such as performing power management functions. In another example, the SMI handler 130 can include an MCE handler for handling machine check exceptions. In an example, the visible logical processor(s) execute the SMI handler 130 upon receiving the interrupt. The visible logical processor(s) can then signal the hidden logical processor(s) to execute the SMI handler 130 (e.g., by writing to a memory location that the hidden logical processor(s) are monitoring). At step 306, the SMI handler 130 returns the OS-visible SMM processor(s) to their default modes of operation (e.g., protected mode) for control by the OS 114. The hidden logical processor(s) can remain in SMM and thus remain hidden from the OS 114.

In an example, at step 304, at least one of the hidden logical processor(s) can be released for OS-control during the interrupt. In an example, the OS 114 can coordinate with the system firmware 112 (e.g., the SMI handler 130 and/or the park routine 122) to indicate a request for additional logical processor(s). The system firmware 112 can then transfer at least one of the hidden logical processor(s) to the set of OS-visible SMM processor(s). Once the SMI handler 130 returns from the interrupt, the newly added logical processor(s) become part of the visible logical processor(s) able to be controlled by the OS 114.

In an example, at step 304, at least one of the visible logical processor(s) can be removed from OS-control during the interrupt. In an example, the OS 114 can coordinate with the system firmware 112 (e.g., the SMI handler 130 and/or the park routine 122) to indicate a request for removal of logical processor(s). The system firmware 112 can then transfer at least one of the visible logical processor(s) to the set of hidden logical processor(s). Once the SMI handler 130 returns from the interrupt, the newly removed logical processor(s) stay in SMM and are removed from the visible logical processor(s) able to be controlled by the OS 114.

The methods described above may be embodied in a computer-readable medium for configuring a computing system to execute the method. The computer readable medium can be distributed across multiple physical devices (e.g., computers). The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc., just to name a few. Other new and various types of computer-readable media may be used to store machine readable code discussed herein.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of hiding at least one logical processor in a computer having a plurality of logical processors, comprising:
    initializing the plurality of logical processors by executing a pre-boot routine in system firmware;
    identifying at least one logical processor of the plurality of logical processors to be hidden from an operating system (OS) of the computer to provide at least one hidden logical processor and at least one visible logical processor;
    placing each of the at least one hidden logical processor into a system management mode (SMM) by executing a park routine in the system firmware;
    booting the OS of the computer to use the at least one visible logical processor;
    receiving, from the OS, a global system management interrupt (SMI) to be handled by the at least one hidden logical processor placed into SMM and the at least one visible logical processor; and
    in response to receiving the global SMI, returning the at least one visible logical processor for use by the OS.

2. The method of claim 1, wherein the pre-boot routine includes a power-on self test (POST) routine.

3. The method of claim 1, wherein the step of identifying comprises:
    analyzing hardware configuration attributes in the system firmware to determine which of the plurality of logical processors is to be hidden.

4. The method of claim 1, wherein the step of identifying comprises:
    analyzing selectable settings in the system firmware to determine which of the plurality of logical processors is to be hidden.

5. The method of claim 1, further comprising:
    handling a machine check exception (MCE) using a system management interrupt (SMI) handler routine in the system firmware.

6. The method of claim 1, wherein an SMI handler routine in the system firmware handles the global SMI and responds to receiving the global SMI by returning the at least one visible logical processor for use by the OS.

7. The method of claim 1, further comprising:
    in response to receiving the global SMI:
    requesting another logical processor be visible; and
    re-classifying a logical processor of the at least one hidden logical processor to be visible as part of the at least one visible logical processor.

8. The method of claim 1, further comprising:
    in response to receiving the global SMI:
    requesting removal of a logical processor from the at least one visible logical processor; and
    re-classifying a logical processor of the at least one visible logical processor to be hidden as part of the at least one hidden logical processor.

9. A computer, comprising:
    at least one central processor unit (CPU) integrated circuit (IC) collectively having a plurality of logical processors;
    a memory storing an operating system (OS);
    system firmware having:
        a pre-boot routine executable to initialize the plurality of logical processors;
        a park routine to place at least one logical processor of the plurality of logical processors into a system management mode (SMM) to define at least one hidden logical processor and at least one visible logical processor;
        a bootstrap routine to boot the OS of the computer to use the at least one visible logical processor; and
        a SMI handler routine that responds to a global system management interrupt (SMI) from the OS by returning the at least one visible logical processor for use by the OS, the global SMI to be handled by the at least one hidden logical processor placed into SMM and the at least one visible logical processor.

10. The computer of claim 9, wherein the pre-boot routine includes a power-on self test (POST) routine.

11. The computer of claim 9, wherein the system firmware includes hardware configuration attributes that define a hardware configuration of the computer, and wherein the park routine identifies the at least one hidden logical processor by analyzing hardware configuration attributes.

12. The computer of claim 9, wherein the system firmware includes selectable attributes selected via a user interface, and wherein the park routine identifies the at least one hidden logical processor by analyzing the selectable attributes.

13. The computer of claim 9, wherein the system firmware includes a system management interrupt (SMI) routine to handle at least one of a machine check exception (MCE).

14. The computer of claim 13, wherein the SMI routine re-classifies a logical processor of the at least one hidden logical processor to be visible as part of the at least one visible logical processor, or re-classifies a logical processor of the at least one visible logical processor to be hidden as part of the at least one hidden logical processor, based on a request from the OS.

15. A non-transitory computer readable medium having instructions stored thereon that, when executed by at least one central processing unit (CPU), cause the at least one CPU to perform a method of hiding at least one logical processor of a plurality of logical processors, comprising:
    executing a pre-boot routine to initialize the plurality of logical processors;
    executing a park routine to place at least one of the plurality of logical processors into a system management mode (SMM) to define at least one hidden logical processor and at least one visible logical processor;
    executing a bootstrap routine to boot an operating system (OS) to use the at least one visible logical processor; and
    executing a SMI handler routine that responds to a global system management interrupt (SMI) from the OS by returning the at least one visible logical processor for use by the OS, the global SMI to be handled by the at least one hidden logical processor placed into SMM and the at least one visible logical processor.

16. The non-transitory computer readable medium of claim 15, wherein the SMI handler routine returning the at least one visible logical processor for use by the OS comprises re-classifying a logical processor of the at least one hidden logical processor to be visible as part of the at least one visible logical processor, or re-classifying a logical processor of the at least one visible logical processor to be hidden as part of the at least one hidden logical processor.

* * * * *